(12) United States Patent  (10) Patent No.: US 11,008,461 B2
Saito et al.  (45) Date of Patent: May 18, 2021

(54) SUPER-STRETCHABLE SELF-HEALING POLYMER

(71) Applicant: UT-Battelle, LLC, Oak Ridge, TN (US)

(72) Inventors: Tomonori Saito, Knoxville, TN (US); Pengfei Cao, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 18 days.

(21) Appl. No.: 16/407,873

(22) Filed: May 9, 2019

(65) Prior Publication Data

US 2019/0345334 A1    Nov. 14, 2019

Related U.S. Application Data

(60) Provisional application No. 62/669,565, filed on May 10, 2018.

(51) Int. Cl.
*C08G 83/00* (2006.01)
*C08L 83/04* (2006.01)
*C08G 77/388* (2006.01)
*C08K 5/21* (2006.01)

(52) U.S. Cl.
CPC ............ *C08L 83/04* (2013.01); *C08G 77/388* (2013.01); *C08K 5/21* (2013.01); *C08G 2270/00* (2013.01); *C08G 2280/00* (2013.01); *C08L 2312/00* (2013.01)

(58) Field of Classification Search
None
See application file for complete search history.

(56) References Cited

U.S. PATENT DOCUMENTS

| 2006/0018856 A1* | 1/2006 | Bosman | C08G 77/388 |
| | | | 424/70.12 |
| 2007/0166542 A1* | 7/2007 | Braun | C08L 101/00 |
| | | | 428/402.21 |
| 2016/0049217 A1* | 2/2016 | Tee | H01M 4/622 |
| | | | 429/217 |
| 2016/0194456 A1* | 7/2016 | Kadlec | C08L 83/14 |
| | | | 528/33 |
| 2017/0174842 A1* | 6/2017 | Wang | C08G 77/455 |

OTHER PUBLICATIONS

Zhang et al. "A self-healing PDMS elastomer based on acylhydrozone groups and the role of hydrogen bonds" Polymer, 120, 2017, 189-196. (Year: 2017).*
Cao et al. "Superstretchable, Self-Healing Polymeric Elastomers with Tunable Properties" Adv. Funct. Mater. 2018, 28, 1800741. (Year: 2018).*
Wietor et al. "A Self-Healing Elastomer" Angew. Chem. Int. Ed. 2008, 47, 8161-8163. (Year: 2008).*
Zhang et al. "Self-Healing Supramolecular Elastomers Based on the Multi-Hydrogen Bonding of Low Molecular Polydimethylsiloxanes: Synthesis and Characterzation" J. Appl. Polym. Sci. 2013, 2435-2442. (Year: 2013).*
Yang et al. "The synthesis and characterzation of supramolecular elastomers based on linear carboxyl-terminated polydimethysiloxane oligomers" Polym. Chem. 2014, 4, 153-160. (Year: 2014).*
Tyagi et al. "Siloxane-urea segmented copolymers." Polymer Bulletin 8, No. 11-12 (1982): 543-550. (Year: 1982).*
Yang et al. "The synthesis and characterization of supramolecular elastomers based on linear carboxyl-terminated polydimethylsiloxane oligomers." Polymer Chemistry 5, No. 1 (2014): 153-160. (Year: 2014).*
Cordier P. et al., "Self-healing and thermoreversible rubber from supramolecular assembly", Nature, (2008), 451, pp. 977-980 doi:10.1038/nature06669.

(Continued)

*Primary Examiner* — Robert S Loewe
(74) *Attorney, Agent, or Firm* — Scully, Scott, Murphy & Presser, P.C.

(57) ABSTRACT

An elastic composition comprising the following structure:

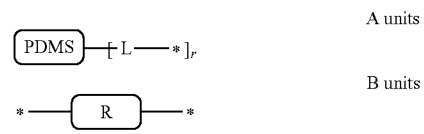

wherein: PDMS is polydimethylsiloxane having at least 5 dimethylsiloxane units; L is a bond or hydrocarbon linker; the asterisk (*) in A units denotes a connection point with an asterisk in B units, and at least one of the following linkages connect between connection points:

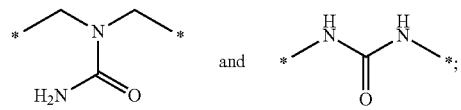

r is an integer of at least 3; R is a hydrocarbon or siloxane-containing linking moiety; the composition includes a multiplicity of A units and multiplicity of B units; and a portion of the connection points are necessarily terminated by endcapping groups, wherein at least a portion of the endcapping groups are selected from the following structures:

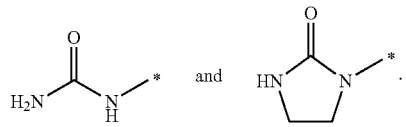

The invention also includes methods for making and using the above-described elastic composition.

29 Claims, 8 Drawing Sheets

(56) References Cited

OTHER PUBLICATIONS

Leitsch E.K. et al., "Nonisocyanate Thermoplastic Polyhydroxyurethane Elastomers via Cyclic Carbonate Aminolysis: Critical Role of Hydroxyl Groups in Controlling Nanophase Separation", ACS Macro Letters, (2016), 5, pp. 424-429 DOI: 10.1021/acsmacrolett.6b00102.

Lopez J. et al., "The Elects of Cross-Linking in a Supramolecular Binder on Cycle Life in Silicon Microparticle Anodes", Applied Materials & Interfaces, (2016), 8, pp. 2318-2324 DOI: 10.1021/acsami.5b11363.

Wang C. et al., "Self-healing chemistry enables the stable operation of silicon microparticle anodes for high-energy lithium-ion batteries", Nature Chemistry, (2013), 5, pp. 1042-1048 DOI: 10.1038/NCHEM.1802.

Wu J. et al., "Tough Self-Healing Elastomers by Molecular Enforced Integration of Covalent and Reversible Networks", Advanced Materials, (2017), 29, 1702616, pp. 1-8 DOI: 10.1002/adma.201702616.

Yang Y. et al., "Chemical and physical aspects of self-healing materials", Progress in Polymer Science, (2015), pp. 34-59 http://dx.doi.org/10.1016/j.progpolymsci.2015.06.001.

\* cited by examiner

6A

6B

SUPER-STRETCHABLE SELF-HEALING POLYMER

CROSS REFERENCE TO RELATED APPLICATION

The present application claims benefit of U.S. Provisional Application No. 62/669,565, filed on May 10, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of cross-linked elastic polymer compositions and membranes thereof, particularly polysiloxane based elastic and self-healing materials, and also methods of acoustic and vibrational damping and gas separation by use of such materials.

BACKGROUND OF THE INVENTION

Materials having the capability to self-heal have been long sought, particularly in the case of biomimetic materials, such as materials mimicking skin. Separation membranes would also benefit from self-healing materials with recoverable functionalities because fractures and pin-hole defects are known to adversely affect the separation performance. Stretchable elastomers that self-heal could also be of use in epidermal devices (e.g., that include wearable bio-signal monitors), strain/pressure/humidity sensors, displays, and stretchable or flexible batteries. Although elastic materials with a limited degree of self-healing capability are known, efforts in producing materials with super elasticity along with self-healing ability (e.g., to better simulate skin) have been largely unsuccessful.

SUMMARY OF THE INVENTION

The present disclosure is directed to elastic compositions exhibiting a high degree of elasticity, and even super elasticity, along with a self-healing ability. Thus, the elastic compositions described herein can advantageously be used in a number of applications in which a high degree of elasticity and self-healing ability would be advantageous. Some applications include, for example, skin simulating material, monitors, sensors, displays, damping materials, membranes in lithium-ion batteries, and gas separation membranes.

The elastic compositions have the following structure:

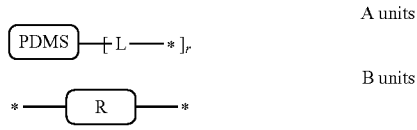

In the formula above, PDMS is polydimethylsiloxane having at least 5 dimethylsiloxane units; L is a bond or hydrocarbon linker; the asterisk (*) in A units denotes a connection point with an asterisk in B units, and at least one of the following linkages connect between connection points:

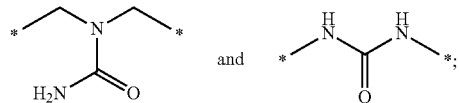

r is an integer of at least 3; R is a hydrocarbon or siloxane-containing linking moiety; the composition includes a multiplicity of A units and multiplicity of B units; and a portion of the connection points are necessarily terminated by endcapping groups, wherein at least a portion of the endcapping groups are selected from the following structures:

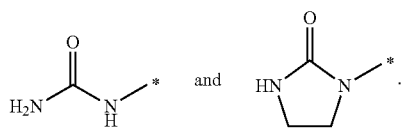

In another aspect, the present disclosure is directed to a method for producing the above-described elastic composition. The method includes reacting the following components:

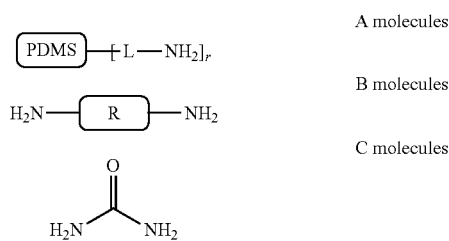

under conditions where C molecules and amino groups from molecules A and B undergo condensation to produce a product containing a multiplicity of A and B units, as described above.

DETAILED DESCRIPTION OF THE INVENTION

Figure 1:
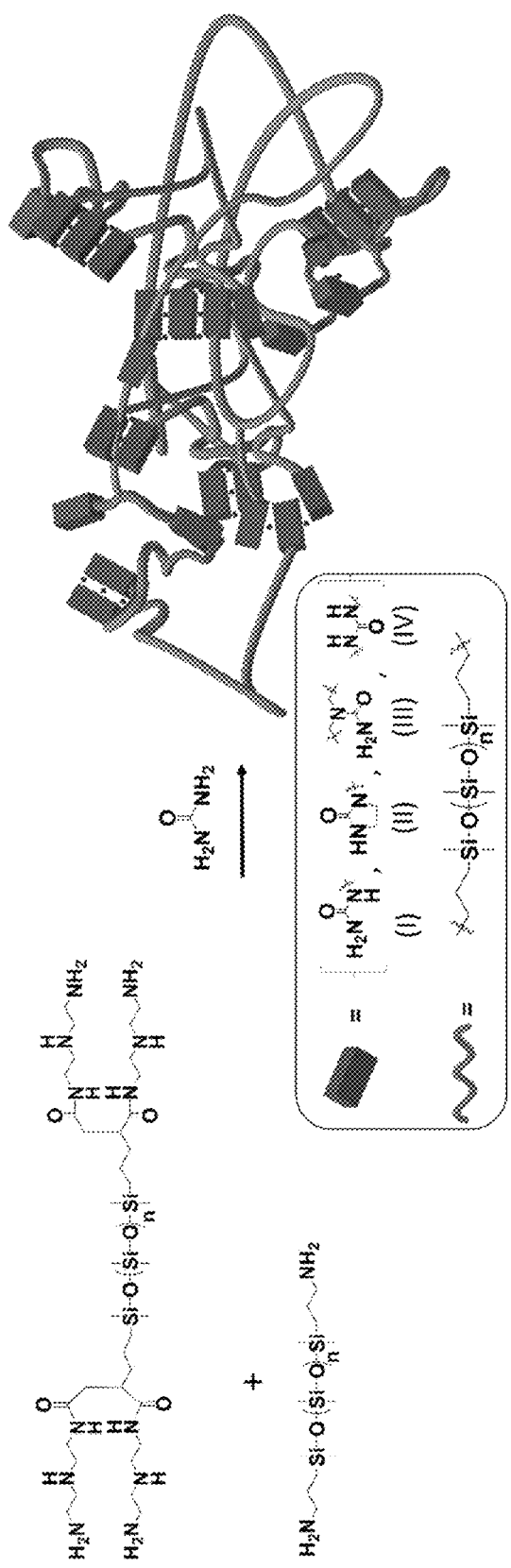
FIG. 1 is a schematic showing synthesis of urea functionalized poly(dimethyl siloxane)-based elastomers (U-PDMS-Es).

In a first aspect, the present disclosure is directed to a cross-linked elastic composition containing polydimethylsiloxane (PDMS) units. The term "elastic," as used herein, generally refers to an ultimate elongation of at least 50%. In different embodiments, the elastic composition exhibits an ultimate elongation of about, at least, or more than, for example, 50%, 100%, 200%, 300%, 400%, 500%, 600%, 700%, 800%, 900%, 1000%, 1200%, 1500%, 1800%, 2000%, 2500%, 3000%, 3500%, 4000%, 4500%, 5000%, 5500%, or 6000%, or an ultimate elongation within a range bounded by any two of the foregoing values. In addition to the foregoing elasticity, the elastic composition typically exhibits an ultimate tensile strength of at least 20 kPa. In different embodiments, the elastic composition exhibits a tensile strength of about, at least, or more than, for example, 20, 30, 40, 50, 60, 70, 80, 90, 100, 200, 300, 400, or 500 kPa, or a tensile strength within a range bounded by any two of the foregoing values. The elastic composition may also exhibit a toughness of at least or above, for example, 1, 2, 3, 4, 5, 6, 7, 8, 9, or 10 MJ/m³. As used herein, the term "about" generally indicates within ±20%, 10%, 5%, 2%, or 1%. Thus, a value of "about 10" generally indicates in its broadest sense 10±20%, which indicates a value of 8-12.

More specifically, the elastic composition has the following structure:

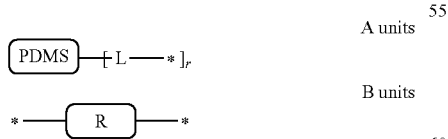

A units

B units

In both A and B units, the single lines indicate covalent bonds. The asterisk (*) in any structure shown throughout this disclosure denotes a covalent connection point with another asterisk of any structure shown throughout this disclosure. Any two connection points (asterisks), whether between A and B units, between A units, or between B units, may be covalently bonded. The elastic composition requires at least A units connected with B units. Moreover, at least one of the following linkages (formed via urea-amine condensation) connect between connection points (i.e., between any two asterisks on any groups throughout this disclosure):

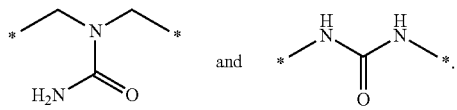

As an example, where an asterisk on an A unit connects with an asterisk on a B unit, one of the two foregoing urea-amine condensation linkages connects between the two asterisks on A and B units. Notably, in addition to A units interconnecting with B units, the elastic composition is believed to also contain some degree of A units interconnecting with A units and B units interconnecting with B units, via the above shown linkages (formed via urea-amine condensation) connecting between connection points.

Thus, some possible basic (simplified) recurring motifs in the elastic composition may include the following:

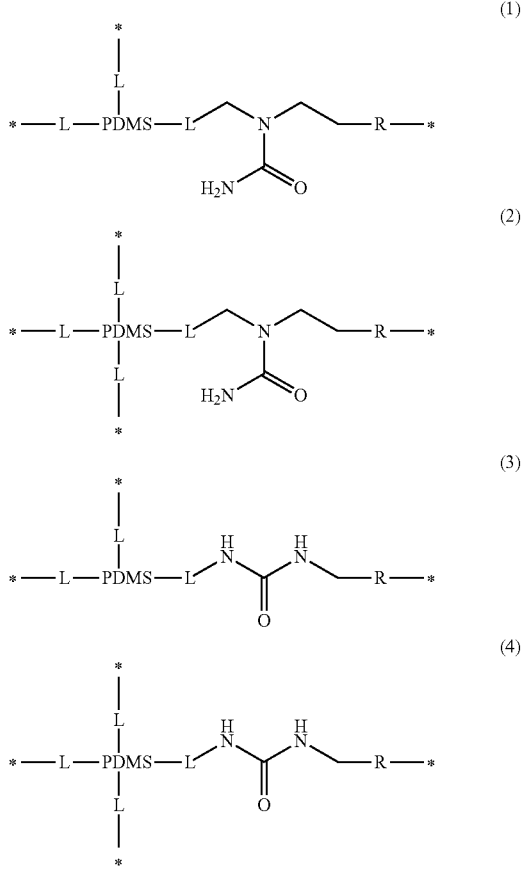

wherein any of the asterisks shown above in formulas (1)-(4) represent connection points with any other asterisks shown in any other of formulas (1)-(4) or with any of the asterisks shown earlier above in A units or B units, with the above shown linkages (formed via urea-amine condensation) connecting between connection points. In typical embodiments, the polymer is constructed from all the possible interconnections, i.e., all of formulas (1)-(4) with each other, and with A units interconnecting with A units and B units interconnecting with B units, via the above shown linkages (formed via urea-amine condensation) connecting between connection points.

The variable r (in the A units) represents the number of branches extending from the PDMS segment, wherein each branch contains the linker L. When r is 3, the PDMS segment has three branches. When r is 4, the PDMS segment has four branches. In some embodiments, some or all of the PDMS segments have an r value of 5, 6, 7, or 8. In some embodiments, all PDMS segments contain a specific r value, such as 3 or 4. In other embodiments, the elastic composition contains PDMS segments with different r values, such as r being 3 and 4. Moreover, as long as PDMS segments are included which contain an r value of at least 3, the composition may also include PDMS segments having an r value of only 2.

The PDMS segment (in the A unit) corresponds to a polydimethylsiloxane segment having at least 5 dimethylsiloxane units. Thus, the PDMS segment can be expressed as follows:

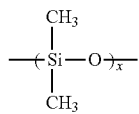

wherein x is at least 5. In different embodiments, the PDMS segment in A units has precisely, about, or at least 5, 10, 15, 20, 25, 30, 35, 40, 45, 50, 100, 150, 200, 250, 300, 350, 400, 450, 500, 550, 600, 650, 700, 750, 800, 850, 900, 950, 1000, 1200, 1500, or higher number of dimethylsiloxane units (i.e., x units), or a number of dimethylsiloxane units within a range bounded by any two of the foregoing values. Notably, as a single dimethylsiloxane unit has a formula weight of about 74, the foregoing numbers of dimethylsiloxane units correspond to a range in PDMS molecular weights of about 350 g/mol (x of about 5) to about 74,000 g/mol (x of about 1000) or 100,000 g/mol (x of about 1351). Moreover, in some embodiments, all of the PDMS segments for A units in the elastic composition have precisely or about the same number of dimethylsiloxane units or molecular weight or are within a particular range of dimethylsiloxane units or molecular weights. In other embodiments, two, three, or more of the PDMS segments in A units differ in the number of dimethylsiloxane units or molecular weights, or are within different particular ranges thereof. Each of the different PDMS segments can be independently selected in their dimethylsiloxane units or molecular weights.

The variable L (in A units) is a bond or hydrocarbon linker. The hydrocarbon linker may contain, for example, at least 1 and up to 10, 20, 25, or 30 carbon atoms, and be saturated or unsaturated, linear or branched, and cyclic (e.g., phenylene, furyl, or cyclopent-di-yl) or acyclic. In some embodiments, the hydrocarbon linker is a linear or branched alkyl linker. For example, the hydrocarbon linker can be according to the formula —(CH$_2$)$_n$—, wherein n is a value of at least 1 and up to, for example, 20, 25, or 30. Moreover, any of the hydrogen atoms shown on the foregoing hydrocarbon linker may (or may not) be substituted with a hydrocarbon group containing, for example, 1-30 carbon atoms, in which case the hydrocarbon linker is branched. Any of the hydrogen atoms may or may not be substituted by fluorine atoms. In one set of embodiments, the hydrocarbon linker contains only carbon and hydrogen atoms, with optional substitution with fluorine. In another set of embodiments, the hydrocarbon linker contains one or more heteroatoms, which may replace one or more hydrogen atoms or insert between carbon atoms. The heteroatoms are typically selected from one or more of nitrogen, oxygen, and sulfur. For example, in some embodiments, the hydrocarbon linker contains one or more carbonyl (C=O), amino (—NH$_2$ or —NH—), hydroxy (—OH), ether (—O—), sulfide (—S—), thiol (—SH), or a combination thereof (e.g., amide or ester). The heteroatom-containing hydrocarbon linker may contain any of the number of carbon atoms described above, and may be linear or branched, as also described above. Notably, in the case of a branched hydrocarbon linker containing heteroatoms, both the linear portion and any branches thereon may contain one or more heteroatoms.

The R segment in B units is a hydrocarbon or siloxane-containing linking moiety (linker). In the case of R being a hydrocarbon linker, R can independently be selected from any of the hydrocarbon linkers and heteroatom-containing linkers described above for L. In some embodiments, R has the structure —(CH$_2$)$_m$—, wherein m is an integer of 2-20, 2-15, 2-10, or 2-8; one or more H atoms in R are optionally replaced with methyl or ethyl groups; one or more —O— or —NH— linkers optionally inserted between carbon atoms in R; one or more H atoms in R are optionally replaced with OH or NH$_2$ groups; and two H atoms on a carbon atom are optionally replaced with an O atom to result in a carbonyl group. In particular embodiments, R is an ethylene (—CH$_2$CH$_2$—) linker, trimethylene (—CH$_2$CH$_2$CH$_2$—) linker, or propylene (—CH(CH$_3$)CH$_2$—) linker. In the case of R being a siloxane-containing linking moiety, R may contain a single siloxane unit, but more typically, R is a polysiloxane, such as a disiloxane, trisiloxane, tetrasiloxane, or polydimethylsiloxane (PDMS). The polysiloxane in R may be linear or branched and may have precisely, about, or at least 5, 10, 15, 20, 25, 30, 35, 40, 45, 50, 100, 150, 200, 250, 300, 350, 400, 450, 500, 550, 600, 650, 700, 750, 800, 850, 900, 950, or 1000 units, which may be selected from M, D, T, and Q groups. In some embodiments, the polysiloxane in R is a PDMS, which can be independently selected to be any of the PDMS segments described above for the A units, which may have a molecular weight of at least, for example, 350, 400, 500, or 1000 g/mol and up to, for example, 5000, 10,000, 50,000 or 100,000 g/mol.

The elastic composition includes a multiplicity of A units and multiplicity of B units. The term "multiplicity," as used herein, generally refers to the presence of at least three A units and at least three B units. For purposes of the invention, the elastic composition has sufficient numbers of A and B units (e.g., at least or more than 10, 20, 30, 40, 50, 100, 500, or 1000 of each) to function as a macroscopic material with an elastic property, rather than a molecule. Thus, typically, the elastic composition includes an unlimited and vast number of A and B units, as is well known in the polymer arts. In one embodiment, the number of A units is precisely or approximately the same as the number of B units, i.e., A and B units are in a precise or approximate ratio of 1:1. In other embodiments, the number of B units is greater (e.g., at least double or triple) than the number of A units, such as a ratio of A:B units of 1:1.5, 1:2, 1:2.5, 1:3, 1:4, 1:5, 1:6, 1:7, 1:8, 1:9, 1:10, 1:11, or 1:12, or a ratio within a range bounded by any two of the foregoing ratios. In other embodiments, the number of A units is greater than the number of B units, such as a ratio of A:B units of 1.5:1, 2:1, 2.5:1, 3:1, 4:1, 5:1, 6:1, 7:1, 8:1, 9:1, 10:1, 11:1, or 12:1, or a ratio within a range bounded by any two of the foregoing ratios. The foregoing ratios (and other ratios discussed later below) are understood to be molar ratios.

In the elastic composition, a portion of the connection points are necessarily terminated by endcapping groups, wherein at least a portion of the endcapping groups are selected from the following structures:

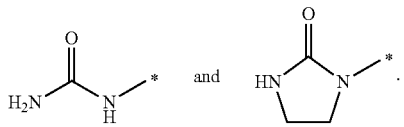

In some embodiments, the elastic composition is in the shape of a film, which may also be referred to as a membrane. The thickness of the membrane is typically at least 10 nm (0.01 microns). In different embodiments, the membrane may have a thickness of precisely, about, up to, less than, at least, or above, for example, 10 nm, 20 nm, 50 nm, 100 nm, 250 nm, 500 nm, 1000 nm (1 μm), 2 μm, or 5 μm, 10 μm, 30 μm, 40 μm, 50 μm, 100 μm, 150 μm, 200 μm, 250 μm, 300 μm, 350 μm, 400 μm, 500 μm, or 1000 μm (1 mm), or a thickness within a range bounded by any two of these values (e.g., 30-1000 μm).

The membrane may or may not also contain pores, particularly mesopores (2 to 50 nm pore size) or micropores (less than 2 nm pore size). In different embodiments, the membrane contains pores having a size of up to or less than, for example, 100, 50, 40, 30, 20, 10, 5, 4, 3, 2, 1, or 0.5 nm, or a pore size within a range bounded by any two of these values.

The membrane may or may not also function as part of a layered composite material, wherein the membrane either overlays, underlies, or is sandwiched between one or more layers of another material. In some embodiments, the one or more layers of another material provides greater structural integrity to the membrane. The one or more layers of another material necessarily include structural features (e.g., pores or slits) that permit the gas to flow through the membrane. The one or more layers of another material may be porous or non-porous, and can be composed of, for example, a ceramic (e.g., silica, alumina, or aluminosilicate), paper, plastic, graphite, metal oxide, or an organic, inorganic, or hybrid polymer, or combination thereof In some embodiments, the membrane is monolithic (i.e., not disposed on or overlaid with a substrate).

In another aspect, the present disclosure is directed to a method for producing the elastic composition described above. In the method, the following components are reacted under conditions conducive for urea-amine condensation:

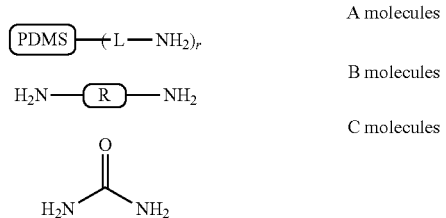

The three components above are reacted under conditions where C molecules and amino groups from molecules A and B undergo condensation to produce an elastic product having the earlier described structure containing A and B units interconnected with each other. The PDMS portion, linker L, and r variable in A molecules are as defined above in A units in the elastic product. In some embodiments, each L includes one or more secondary amine (—NH—) groups in addition to the primary amino group shown attached to L. Each L may also include one or more primary amino groups, in addition to the primary amino group shown attached to L. In some embodiments, each L includes at least one amide linkage. The R portion in B molecules is as defined above in B units in the elastic product. In a typical reaction, the A, B, and C molecules are combined, optionally in the presence of a solvent, and the combined contents heated to a temperature of, for example, 120° C. to 180° C. for a period of at least 2, 3, 4, 5, or 6 hours and possibly up to 12, 24, 36, 48, or 72 hours before being purified and melt processed.

The amino-functionalized PDMS molecule (i.e., A molecule) can be obtained commercially or produced according to methods well known in the art. In particular embodiments, a di-carboxylic acid (or di-anhydride) functionalized PDMS (e.g., succinic acid-terminated PDMS) is condensed with a polyamino (e.g., diamino, triamino, tetramino, or higher amino) molecule, typically in a 1:1 molar ratio with the carboxylic acid functionalized PDMS, to produce an amino-functionalized PDMS containing amide bonds. The B molecule can be any diamino molecule in which R represents a hydrocarbon, siloxane, or polysiloxane segment, as earlier discussed above for the B units. Some particular examples of B molecules include ethylene diamine, diaminobenzene, propylene diamine, diethylenetriamine, triethylenetetramine, and diamino-functionalized siloxanes and polysiloxanes.

In one embodiment, the number of A molecules is precisely or approximately the same as the number of B molecules, i.e., A and B molecules are in a precise or approximate ratio of 1:1 (and hence, the number of A and B units in the product are in a precise or approximate ratio of 1:1). In other embodiments, the number of B molecules is greater (e.g., at least double or triple) than the number of A molecules, such as a ratio of A:B molecules of 1:1.5, 1:2, 1:2.5, 1:3, 1:4, 1:5, 1:6, 1:7, 1:8, 1:9, 1:10, 1:11, or 1:12, or a ratio within a range bounded by any two of the foregoing ratios. In other embodiments, the number of A molecules is greater than the number of B molecules, such as a ratio of A:B molecules of 1.5:1, 2:1, 2.5:1, 3:1, 4:1, 5:1, 6:1, 7:1, 8:1, 9:1, 10:1, 11:1, or 12:1, or a ratio within a range bounded by any two of the foregoing ratios. The C molecules (urea molecules) are generally present in at least a 1:1 molar ratio with the total number of primary amino groups provided by both molecules A and B. As an example, in the event that a ratio of A:B molecules of 1:4 is used, with A molecules possessing four primary amino groups and B molecules possessing two primary amino groups, the number of primary amino groups provided by A and B molecules is 12; thus, in this case, the C molecule is typically included in a molar ratio of precisely, about, or at least 12, i.e., an A:B:C ratio of at least 1:4:12. In some embodiments, the C molecule is included in a molar amount greater than the total number of primary amino groups provided by molecules A and B. For example, the C molecule may be included in an amount of at least or more than 1.1× (i.e., "1.1 times"), 1.2×, 1.3×, 1.4×, 1.5×, 1.6×, 1.7×, 1.8×, 1.9×, or 2× the number of primary amino groups provided by molecules A and B. In some embodiments, A and/or B molecules also contain secondary amines, in which case the C molecule may be included in either: (i) sufficient amount to only react with all primary amines, thus leaving the secondary amines unreacted, or (ii) sufficient amount to also react with at least a portion (or all) of the secondary amines.

In another aspect, the present disclosure is directed to a method of at least partially separating one gas from another gas by passing a gas mixture through a membrane composed of the elastic composition described above. For example, carbon dioxide may be separated from a carbon dioxide-containing mixture of gases by use of the above-described elastic composition. The carbon dioxide-containing mixture of gases contains carbon dioxide in admixture with at least one, two, or three other gases, such as one or more of nitrogen, oxygen, hydrogen, and methane. The carbon dioxide-containing mixture of gases can be, for example, air or an emission from a chemical or industrial process. In the method, the carbon dioxide-containing mixture is passed through a membrane composed of the above-described elastic composition. For the method to be effective, gas exiting the membrane should have an increased carbon dioxide concentration relative to the mixture of gases before being passed through the membrane. Depending on the selectivity of the membrane for preferentially expelling carbon dioxide over other gases, the gas exiting the membrane may be slightly or greatly increased in carbon dioxide content. The selectivity of the membrane for carbon dioxide transport is preferably at least or above 5 over one or more other gases in the mixture, particularly nitrogen. In different embodiments, the membrane exhibits a selectivity for carbon dioxide transport of at least or above, for example, 5, 8, 10, 12, 13, 14, 15, 18, 20, 25, 30, 40, or 50. The permeability of the membrane may be, for example, at least or above 200, 500, 1000, or 2000 barrer. In some embodiments, the gas separation process may be integrally connected with a gaseous output emanating from an industrial or chemical process. The gaseous output may emanate from, for example, a combustion process, such as an electrical power plant.

Examples have been set forth below for the purpose of illustration and to describe certain specific embodiments of the invention. However, the scope of this invention is not to be in any way limited by the examples set forth herein.

EXAMPLES

The following experiments describe a series of self-healable polymeric elastomers with tunable mechanical properties achieved through molecular-weight control of rubbery polymer segments. The experiments also demonstrate the recoverable gas-separation functionality of the obtained polymer membranes. The polymeric elastomers (also referred to herein as "U-PDMS-Es") were synthesized by urea functionalization of polydimethylsiloxane. The polymeric elastomers exhibit a high elongation at break (e.g., 984 to 5,600%). Moreover, adjusting the chain length of PDMS segments can adjust the desired mechanical strength, elasticity, and extensibility of the polymeric elastomers. Completely recoverable mechanical strength and gas-separation performance within two hours at ambient temperature or 20 minutes at 40° C. makes the material attractive for various applications, including functional surfaces, electric/ionic conductors, and different types of electronic devices. Moreover, the U-PDMS-Es also exhibit strain dependent elasticity (nearly perfect elastic recovery in a stretched state) along with excellent acoustic and vibration damping properties over a broad range of temperature (~100° C.), a much wider temperature range than those of typical damping materials (~60° C.).

Fabrication of Polymeric Elastomer

PDMS was selected as the polymer backbone because of its intrinsic high stretch-ability, good thermal/chemical stability and low glass-transition temperature ($T_g$~−123° C.). The low $T_g$ is important to permit chain mobility and impart the self-healing properties of the elastomers obtained. Instead of using pure amine-terminated PDMS, a tetra-diethylenetriamine terminated PDMS (TDA-PDMS, FIG. 1) was herein employed to function as the cross-linker/branching point of the final polymeric elastomers. As further explained below, a particular benefit of using TDA-PDMS is the resulting increase in hydrogen bonding density in the elastomeric material. The amine-terminated PDMS (PDMS-$NH_2$) with different molecular weights (0.9, 3.0, 5.0 and 30 kg/mol) was mixed with TDA-PDMS and reacted with urea in the ratio of TDA-PDMS:PDMS-$NH_2$:Urea=1:5:16 to form a series of U-PDMS-Es. The elastic composition made using PDMS-$NH_2$ with molecular weight of 0.9 kg/mol is hereinafter referred to as "U-PDMS0.9K-E". Similarly, elastic compositions made using PDMS-$NH_2$ with molecular weights of 3.0, 5.0, or 30 kg/mol are hereinafter referred to as "U-PDMS3.0K-E," "U-PDMS5.0K-E," and "U-PDMS30K-E," respectively.

Preparation of the tetra-diethylenetriamine terminated PDMS (TDA-PDMS) was achieved using the following synthetic scheme:

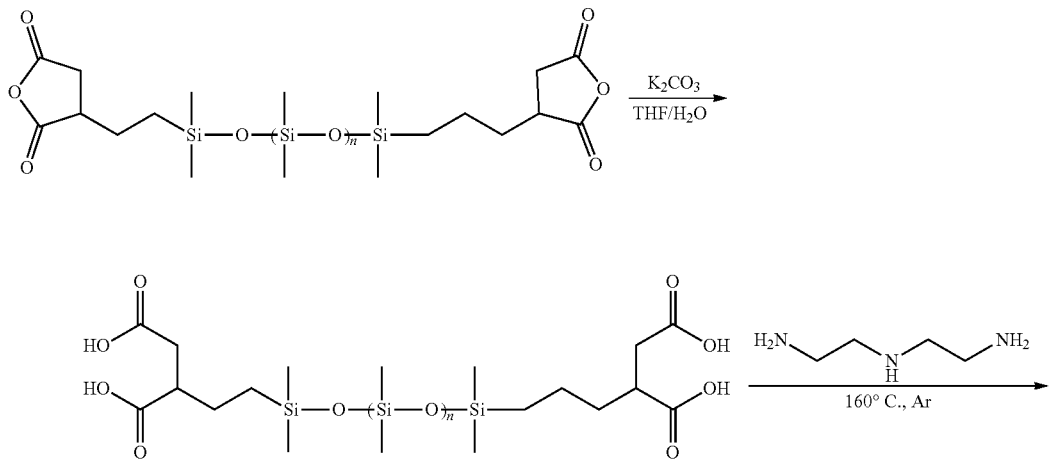

-continued

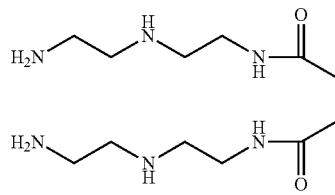 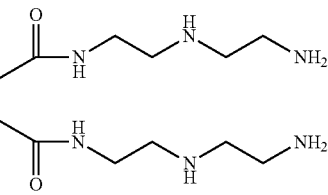

9.0 g of succinic anhydride terminated PDMS (12.9 mmol) in 20 mL tetrahydrofuran (THF) and 8.9 g (158.6 mmol) of potassium carbonate ($K_2CO_3$) in 5 mL DI water were mixed in a 100 mL round bottom flask and stirred. After 12 hours, the pH of solution was adjusted to 7 by addition of hydrochloric acid (HCl), when a white precipitate came out. The precipitate was collected and washed with DI water for 3 times. The product was dried under vacuum overnight before characterization. 5.0 g of the tetra-acid terminated PDMS (TDA-PDMS) (7.14 mmol) was mixed with 7.37 g of diethylenetriamine (71.4 mmol) in a 50 mL Schlenk tube. The mixture was heated at 120° C. for 2 hours before the temperature was raised to 160° C. for 24 hours under inert atmosphere. The product was purified by dialysis against mixed solvent [$V(H_2O)/V(CH_3OH)$=1:1]. The final product was confirmed by $^1$H NMR and other analysis.

Synthesis of PDMS-based polymer elastomers (U-PDMS-Es):

NMR spectrometer using DMSO-$d_6$. Infrared (IR) spectra were recorded on an FT-IR spectrometer with a scanning range of 4000-400 $cm^{-1}$. Approximately 10 mg of each sample was weighted out for testing. The samples were heated up to 800° C. from room temperature at a heating rate of 20° C./min under a dry nitrogen atmosphere (flow rate: 40 mL/min). Thermal transitions of polymer films were observed using a modulated DSC. The heating procedure was set to modulate +/−1.00° C. every 60 seconds at the rate of 3° C./min from −160 to 90° C.

Tensile analysis: Rectangular stripes prepared by melt-press at 160° C., and films were cut into approximately (7.0×5.0×0.5) mm specimens for tensile analysis. Samples were elongated at the rate of 1 mm/s till break. U-PDMS30K-E was measured using an HR-2 rheometer with the SER3 (Xpansion Instruments) Universal Testing Platform due to its ultra-high elongation. The sample was stretched by two counter-rotating drums with a constant angular velocity. The elongation results tested by both

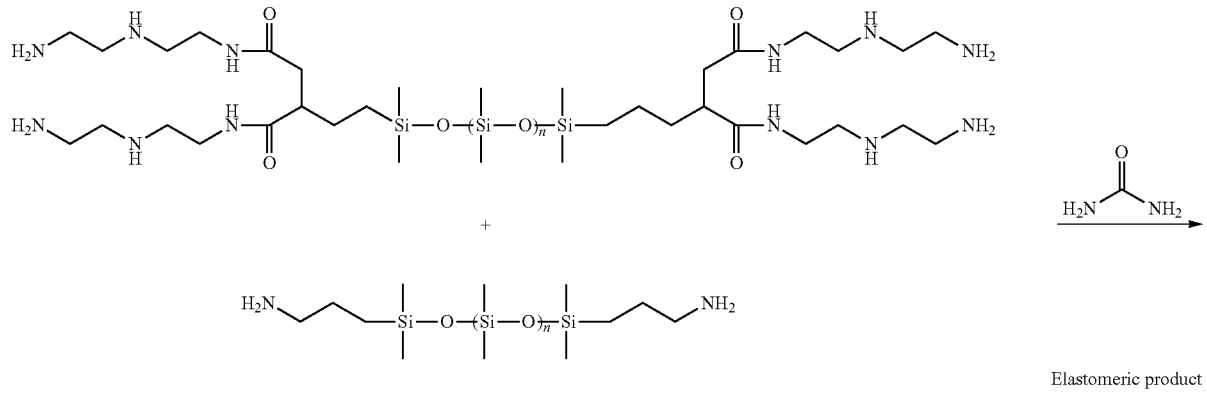

Elastomeric product

In a typical synthesis of U-PDMS0.9K-E, 1.8 g of amine-terminated PDMS ($M_w$=900 g/mol, 2.0 mmol), 0.384 g (6.4 mmol) of urea and 0.44 gram (0.4 mmol) of the four-arm PDMS amide were combined in a 25 mL Schlenk tube. The tube was heated up under continuous Ar flow, the temperature increase was 20° C. per 30 minutes until the oil bath reached 150° C., and then the temperature was kept at 150° C. for two days to obtain the final product. After the reaction cooled, the product was washed with methanol three times to remove the unreacted impurities, then placed in the vacuum oven to remove solvent. The purified product can be swollen in organic solvent, such as acetone, THF, but cannot be completely dissolved. The U-PDMS-Es were processed by melt pressing at 160° C. to obtain homogeneous films for testing.

Characterization

Structural characterization: $^1$H Nuclear magnetic resonance (NMR) spectra were recorded on a Bruker® 400 MHz methods with the same strain rate are comparable. The reported tensile properties were an average of a minimum of three samples.

Dynamic mechanical analysis: Hysteresis analysis was performed on a TA Instruments RSA-G2 Solids Analyzer. Rectangular samples were prepared by melt-press at 160° C., and films were cut into approximately (18.0×5.0×0.5) mm specimens. Samples were elongated to 100% strain then back to 0% strain at a constant rate of 0.1 mm/s. Ten cycles of testing were performed for all samples.

Rheology measurements: Small-amplitude oscillatory shear (SAOS) measurements of membrane samples were carried out on an AR2000ex rheometer (TA Instruments) by using 8 mm plates with a parallel-plate geometry. The temperature was controlled by an environmental test chamber filled with nitrogen. Prior to measurements, the sample was purged at 100° C. for 0.5 h under a nitrogen atmosphere to ensure thermal equilibrium was achieved. All samples were measured at 0.3% strain with a temperature sweep from −100° C. to 125° C., with a heating rate of 3° C./min. Sample U-PDMS5.0K-E and its mixture of starting material were tested separately with frequency sweep from 100 rad/s to 0.01 rad/s at 25° C.

Gas permeation analysis: The gas permeability of the polymer network was measured by a custom-built constant volume-variable pressure test chamber and calculated using the following equation:

$$P_A = \frac{V_c l}{RTA_m \Delta P} \frac{dP_l}{dt}$$

where $P_A$ is the permeability of the gas A, $V_c$ is the permeation volume, l is the membrane thickness, R is the ideal gas constant, $A_m$ is the membrane area that was measured using ImageJ software, $\Delta P$ is the pressure difference between the upstream and downstream, $dP_l/dt$ is the increase rate of gas pressure on the permeation side. In a typical measurement, the parameters were set up as follows: $V_c$=23.33 cm$^3$, l=140-190 μm, $\Delta P$=120-140 kPa. The gas selectivity was obtained by the ratio of $CO_2$ permeability to $N_2$ or $CH_4$ permeability.

Quantum chemical simulation: All calculations were performed with the hybrid PBE0 functional, the def2-TZVPP basis set, the resolution-of-identity (RI) for the computation of the two-electron integrals, Grimme's D3 dispersion correction, and the Becke-Johnson damping function. Integral evaluations were performed with an ultrafine grid and tight convergence criteria in the Turbomole™ 7.1 software package. Frequency calculations were performed to ensure optimized geometries are energy minima or saddle points of the potential energy surface.

Figure 8:
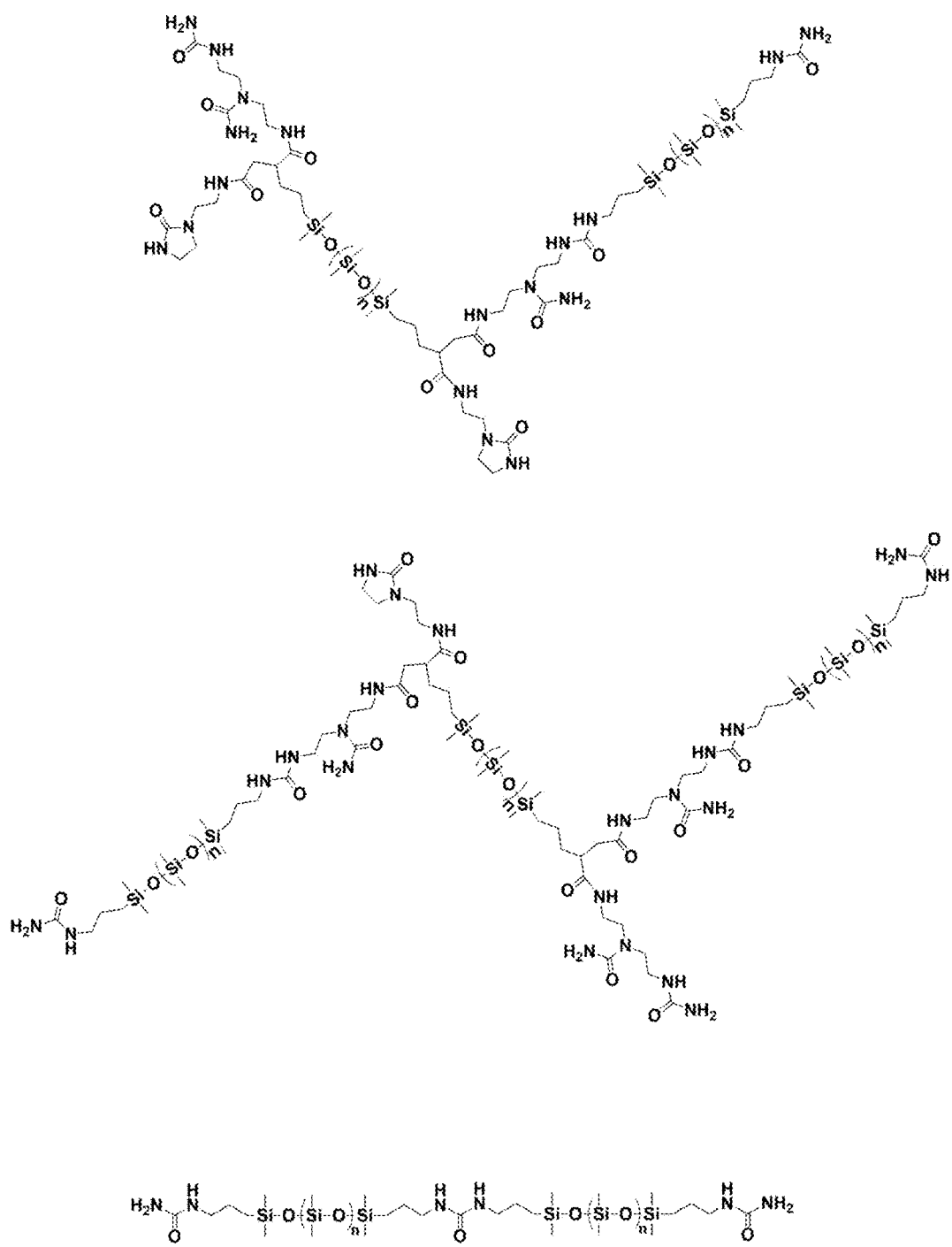
FIG. 8 is a possible chemical structure of the obtained U-PDMS-Es.

As illustrated in FIG. 1, there are four possible functional groups in the PDMS-based polymer elastomer that can associate via multiple hydrogen bonds. Type I and type II are end groups, and type III and type IV are adjunction units (inset of FIG. 1). The supramolecular physical interactions between the associating units in U-PDMS-Es play a vital role in their ultimate physical properties, especially self-healing properties. Quantum chemical calculations were employed to estimate the interaction strength of polymeric elastomers. Among the four types of associating units, type I provides the strongest supramolecular interactions and shortest hydrogen bond length, whereas type II shows the weakest interactions, which is illustrated by their calculated interaction energies (−18.2 kcal/mol for I-I dimer vs −16.4 kcal/mol for II-II dimer from computational simulation) among all of the possible dimer combinations. FIG. 8 shows a possible chemical structure of the obtained U-PDMS-Es.

Figure 2A:
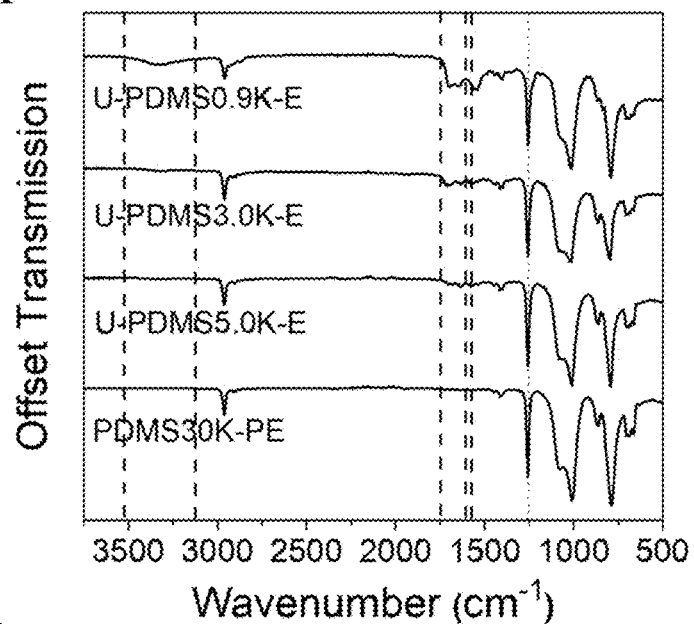
FIG. 2A shows IR spectra of U-PDMS-Es with different molecular weights of PDMS after normalizing the absorption band corresponding to the C—Si bond at 1257 $cm^{-1}$.

FIG. 2A shows IR spectra of U-PDMS-Es with different molecular weights of PDMS after normalizing the absorption band corresponding to the C—Si bond at 1257 cm$^{-1}$. As shown in FIG. 2A, with the normalized FT-IR absorption band corresponding to the C—Si bond at 1257 cm$^{-1}$, significantly decreased intensity of the absorption bands lying at 3511-3120 cm$^{-1}$ (N—H stretching), 1740-1625 cm$^{-1}$ (C=O stretching) and 1561 cm$^{-1}$ (associated N—H bending) manifest the decreased intensity of the urethane groups.

Figure 2B:
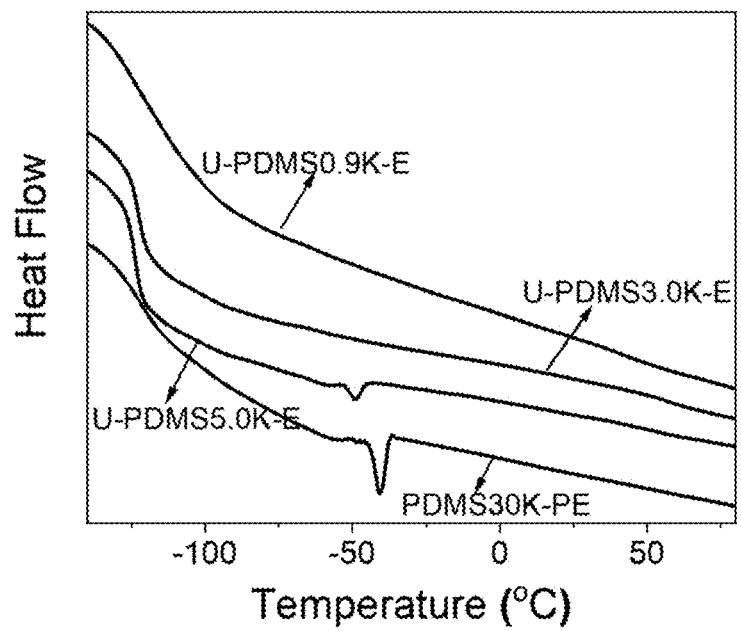
FIG. 2B shows temperature-modulated differential scanning calorimetry (TM-DSC) curves of U-PDMS-Es.

FIG. 2B shows the temperature-modulated differential scanning calorimetry (TM-DSC) curves of the U-PDMS-Es compositions. As shown, the U-PDMS-Es exhibit enhanced thermal stability with increased molecular weight of PDMS, and no significant weight loss was observed for U-PDMS5.0K-E up to 450° C. Comparing with one glass transition peak and one melting peak in the temperature-modulated differential scanning calorimetry (TM-DSC) curve of PDMS3.0K-NH$_2$, the DSC curve of U-PDMS3.0K-E only shows a single glass transition peak (FIG. 2B). Two melting peaks were observed in the heating run of PDMS5.0K-NH$_2$ and PDMS30K-NH$_2$, whereas the U-PDMS5.0K-E and U-PDMS30K-E only show one small melting peak. The different thermal behavior of U-PDMS-Es compared with that of PDMS-NH$_2$ are likely attributed to the effect of chemical/physical cross-linking, which limits the mobility of polymer chains and growth of crystalline structure. Moreover, the presence of only one $T_g$ in the heating run of TM-DSC indicates no significant phase separation within the U-PDMS-Es. The absence of a periodic phase-separated structure was also confirmed by small-angle X-ray scattering (SAXS) spectra of the U-PDMS-Es.

Mechanical Properties Analysis

Figure 3A:
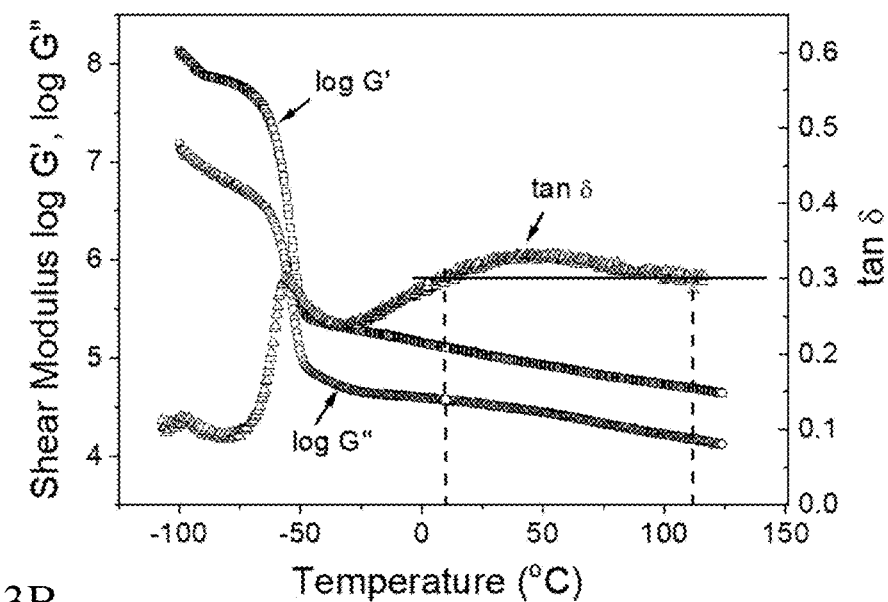
FIG. 3A is a graph showing temperature sweep of shear modulus on U-PDMS5.0K-E.

Compared with the completely liquid-like starting materials, the U-PDMS5.0K-E shows rubber-like properties (G'>G" over the frequency range at ambient temperature) due to the formation of a cross-linked network by chemical and physical interactions. The significant storage modulus (G') increase of U-PDMS5.0K-E with frequency can be explained by considering that there is adequate time for entangled polymer chains to relax at low frequency whereas there is less time for rearrangements to occur at high frequency. The storage modulus (G') of U-PDMS-Es at ambient temperature (or at 0° C.) decreases with the molecular weight of PDMS segments. With Tan δ≥0.3 as the typical criterion for excellent damping properties of polymer materials, a temperature sweep dynamic mechanical analysis showed that U-PDMS-Es can serve as acoustic and vibration damping materials over a broad temperature range. FIG. 3A is a graph showing a temperature sweep of shear modulus on U-PDMS5.0K-E. As shown in FIG. 3A, U-PDMS0.9K-E, U-PDMS5.0K-E and U-PDMS30K-E exhibit excellent damping properties from −48° C. to 48° C., 17° C. to 119° C. and −39° C. to 100° C., respectively, which are much broader temperature ranges than the typical effective damping materials reported in the literature (the range of ~60° C.).

Figure 3B:
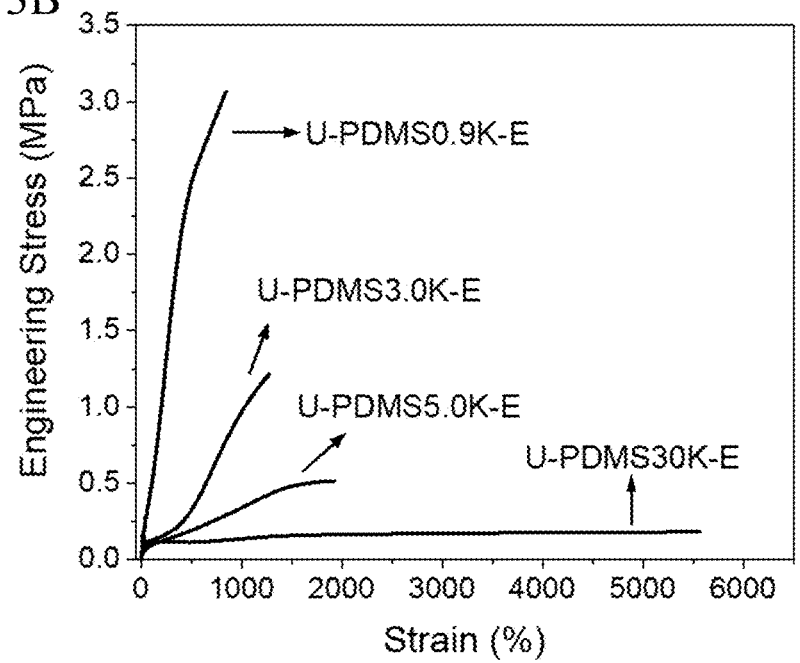
FIG. 3B is a plot of tensile test of the U-PDMS-Es with PDMS of different molecular weights (molar ratio of TDA-PDMS /PDMS-$NH_2$ is fixed at 1:5), wherein U-PDMS-E* means the molar ratio of TDA-PDMS /PDMS-$NH_2$=1:10, strain rate=1 $s^{-1}$.

To evaluate the tensile behavior of U-PDMS-Es, polymer films with thickness of 0.15 mm and width of 3.5 mm were fabricated by melt press. The polymer film made from U-PDMS5.0K-E can be stretched from 1.5 cm to 18 cm by hand pulling. FIG. 3B is a plot of tensile test of the U-PDMS-Es with PDMS of different molecular weights (molar ratio of TDA-PDMS /PDMS-NH$_2$ is fixed at 1:5), wherein U-PDMS-E* means the molar ratio of TDA-PDMS /PDMS-NH$_2$=1:10, strain rate=1 s$^{-1}$. As illustrated in FIG. 3B, all of the U-PDMS-Es showed extremely high elongation at break and relatively high tensile stress, which is not known to be achieved by urea functionalized fatty dimer acid and other common polymeric elastomers, such as covalently cross-linked PDMS. The U-PDMS-Es with lower molecular-weight of PDMS showed higher Young's modulus and ultimate tensile strength, which is consistent with the rheology data. The foregoing result can likely be explained by the higher density of hydrogen bonding in the polymer network, as indicated by the data in Table 1 below. The U-PDMS-Es with higher molecular weight of PDMS showed better extensibility (up to 5,500%) due to the longer polymer segments between the physical/chemical cross-linking points. To study the effect of cross-linker ratio on the mechanical property of finalized product, U-PDMS5.0K-E* with the molar ratio of TDA-PDMS : PDMS-NH$_2$=1:10 was also synthesized and tested (FIG. 3B and Table 1). Notably, with the lower density of hydrogen bonding, U-PDMS5.0K-E* exhibited lower Young's modulus and higher extensibility.

TABLE 1

Combined Young's modulus, elongation, ultimate tensile strength, and toughness of U-PDMS-Es and U-PDMS5.0K-E after self-healing

| Sample | Et (KPa) | εb (%) | Ultimate Tensile Strength (KPa) | Toughness (MJ/m$^3$) |
|---|---|---|---|---|
| U-PDMS0.9K-E | 230 ± 7.6 | 984 ± 64 | 1,110 ± 180 | 7.14 ± 1.6 |
| U-PDMS3.0K-E | 60.1 ± 12 | 1,479 ± 47 | 397 ± 52 | 2.72 ± 0.23 |
| U-PDMS5.0K-E | 37.2 ± 5.8 | 1,811 ± 81 | 227 ± 20 | 2.45 ± 0.046 |
| U-PDMS5.0K-E-Healing | 33.9 ± 6.8 | 2,094 ± 128 | 192 ± 26 | 2.07 ± 0.033 |
| U-PDMS5.0K-E* | 31.7 ± 5.7 | 2,561 ± 85 | 86.6 ± 9.1 | 1.46 ± 0.24 |
| U-PDMS30K-E | 27.3 ± 5.6 | 5,596 ± 200 | 61.1 ± 9.0 | 2.47 ± 0.28 |

Figure 4:
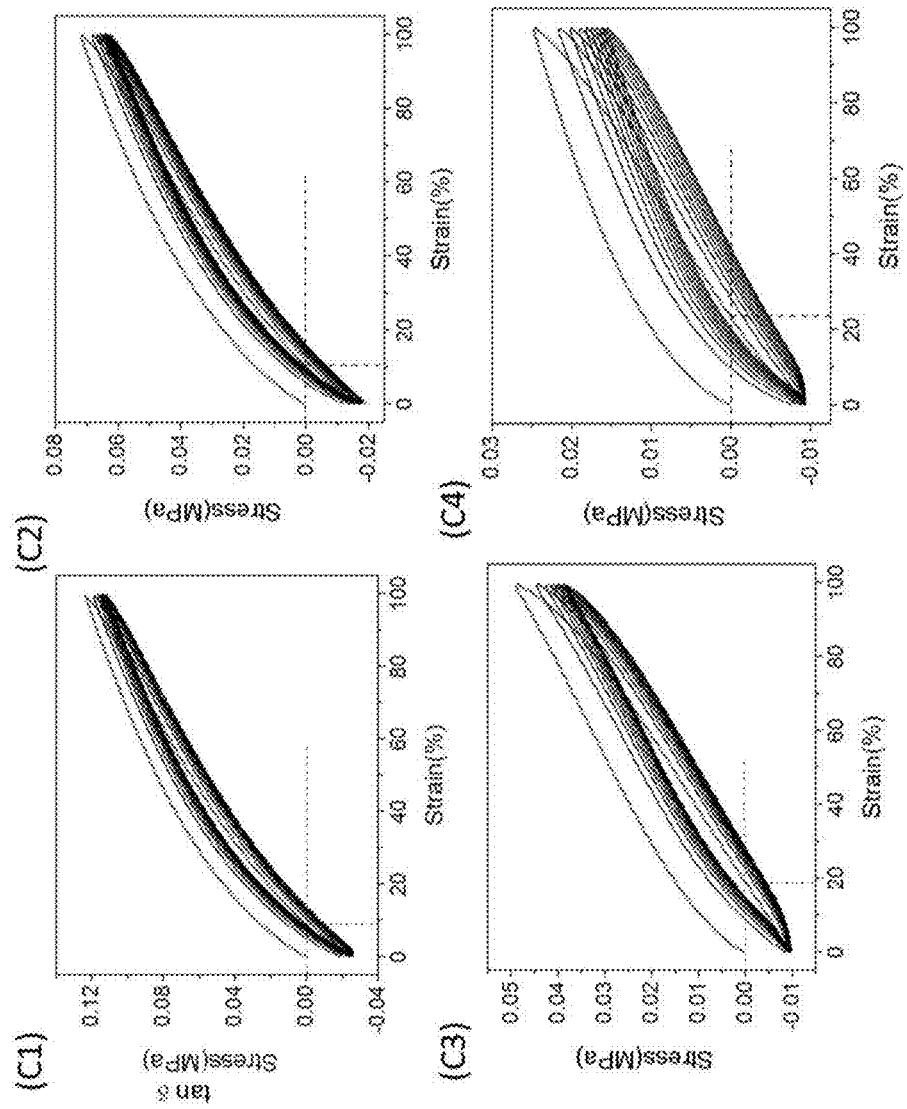
FIG. 4 shows four panels (C1-C4), wherein each panel is a plot of ten successive loading-unloading cycles of a film prepared from U-PDMS-Es (Panel C1: U-PDMS0.9K-E; Panel C2: U-PDMS3.0K-E; Panel C3: U-PDMS5.0K-E; Panel C4: U-PDMS30K-E), top curve is the 1st hysteresis loop.

Hysteresis of elastic recovery was also evaluated by applying 10 cycles of 100% strain on the U-PDMS-Es. FIG. 4 shows four panels (C1-C4), wherein each panel is a plot of ten successive loading-unloading cycles of a film prepared from U-PDMS-Es (Panel C1: U-PDMS0.9K-E; Panel C2: U-PDMS3.0K-E; Panel C3: U-PDMS5.0K-E; Panel C4: U-PDMS30K-E), top curve is the 1st hysteresis loop. As shown in FIG. 4, the U-PDMS-Es do not show perfect recovery. It can be seen that from the first loading-unloading cycle of U-PDMS5.0K-E (top curve in FIG. 4, Panel C3), after tensile stress went back to 0, the residual strain was 18%. The tensile stress loss for the following loading-unloading cycles was slightly lower than those of previous cycles. The observed hysteresis can be partially attributed to the energy dissipation from the physical bonding dissociation, which is consistent with its excellent damping properties. Moreover, lower molecular weights of PDMS segments can improve the elastic recovery of U-PDMS-Es: residual strains with 8%, 11%, 18% and 23% (when tensile stress back to 0) at the first loading-unloading cycles are observed for U-PDMS0.9K-E, U-PDMS3.0K-E, U-PDMS5.0K-E, and U-PDMS30K-E, respectively.

Figures 5A, 5B, 5C:
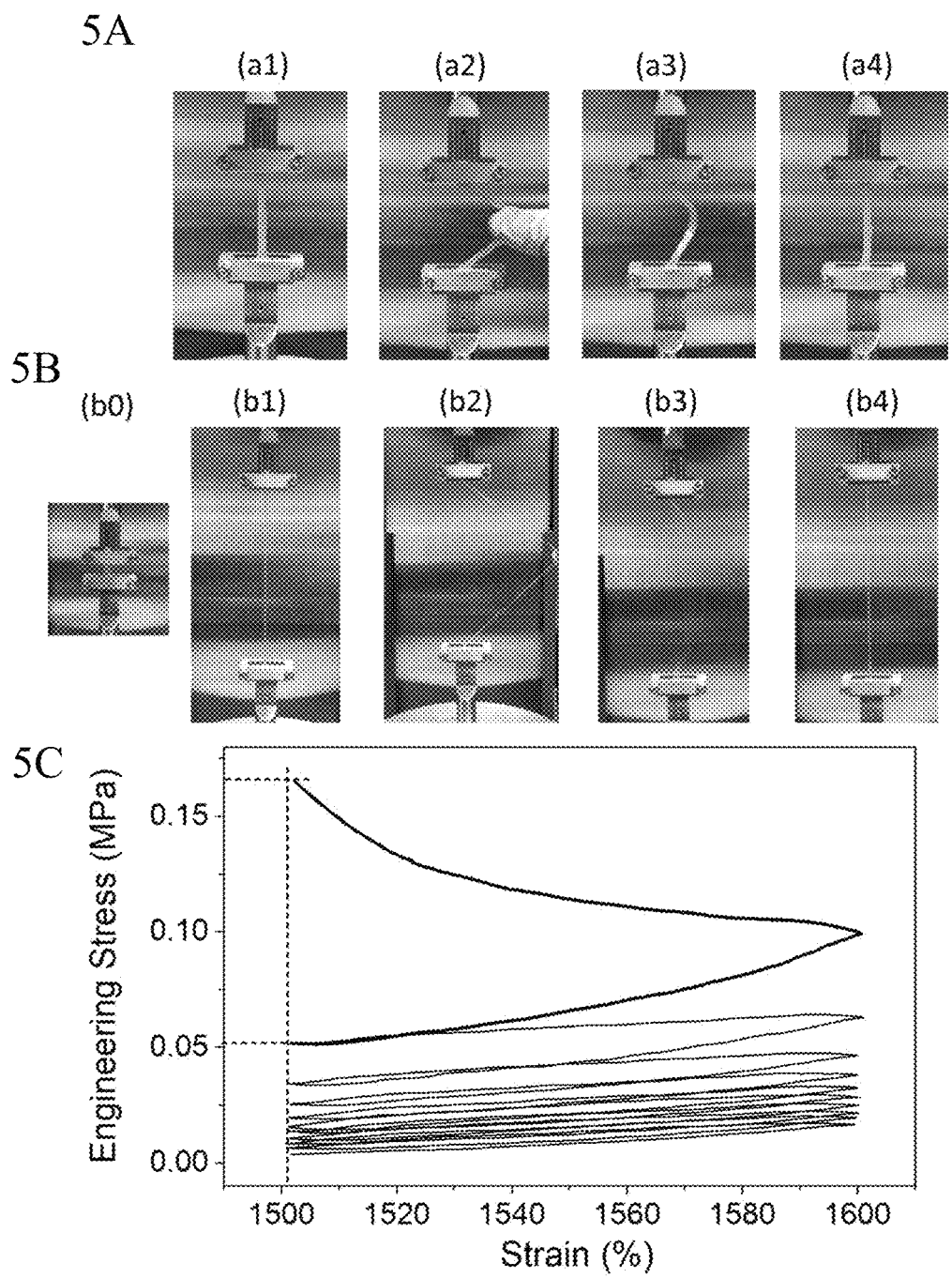
FIGS. 5A and 5B shows a series of pictures (panels (a1)-(a4) and panels (b0)-(b4), respectively) of manual sideways stretching tests of U-PDMS5.0K-E before elongation (FIG. 5A) and after 1,500% elongation (FIG. 5B): (a3)/(b3) and (a4)/(b4) are images of 2 seconds and 5 seconds, respectively, after releasing the manual stretching.
FIG. 5C is a stress-strain plot of ten successive loading-unloading cycles (1,500%-1,600%) of the film prepared from U-PDMS5.0K-E.

Another intriguing phenomenon observed on the U-PDMS-Es is shown in FIGS. 5A-5C. FIGS. 5A and 5B show a series of pictures (panels (a1)-(a4) and panels (b0)-(b4), respectively) of manual sideways stretching tests of U-PDMS5.0K-E before elongation (FIG. 5A) and after 1,500% elongation (FIG. 5B), wherein (a3)/(b3) and (a4)/(b4) are images of 2 seconds and 5 seconds, respectively, after releasing the manual stretching. FIG. 5C is a stress-strain plot of ten successive loading-unloading cycles (1,500%-1,600%) of the film prepared from U-PDMS5.0K-E. After manual sideways stretching and releasing the film made from U-PDMS5.0K-E, the film cannot recover perfectly (FIG. 5A, panels (a1)-(a4)), which is consistent with the hysteresis data. When held at a fixed 1,500% elongation (from panels (b0) to (b1) in FIG. 5B), after further manual sideways stretching and release, the stretched sample recovers immediately like a rubber. This observation demonstrates the strain-dependent elasticity and nearly perfect recovery of U-PDMS-E in the stretched state. To further understand the elastic recovery in the stretched state, a hysteresis test was also performed on the U-PDMS5.0K-E after 1,500% elongation, with the results shown in FIG. 5C. When stretched at 1,500% elongation, a tensile stress of 160 kPa was detected, which is consistent with the tensile test shown in FIG. 3B. The high tensile stress (160-52 kPa) during the 1$^{st}$ hysteresis loop (1,500% to 1,600% and back to 1,500%) likely contributes to this elastic recovery process (from 1,600% to 1,500%). Significantly less tensile stress loss was observed for the successive loading-unloading cycles. Even after 10 cycles, a tensile stress of 3.5 kPa was still detected, which demonstrates the capacity of elastic recovery for several cycles in the stretched state. The super stretchability, along with their adjustable Young's modulus, elasticity and ultimate tensile strength through molecular weight control, make them attractive candidates for the fabrication of highly stretchable devices, and the systematic investigation presented here provides a design guide.

Healable Mechanical Properties

Figure 6A:
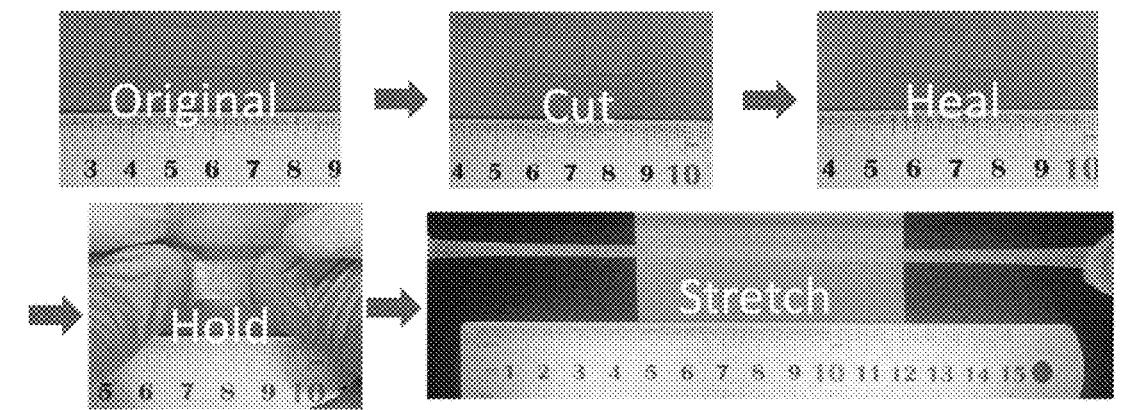
FIG. 6A is a schematic showing the healing process of polymer membranes made from U-PDMS5.0K-E.
Figure 6B:
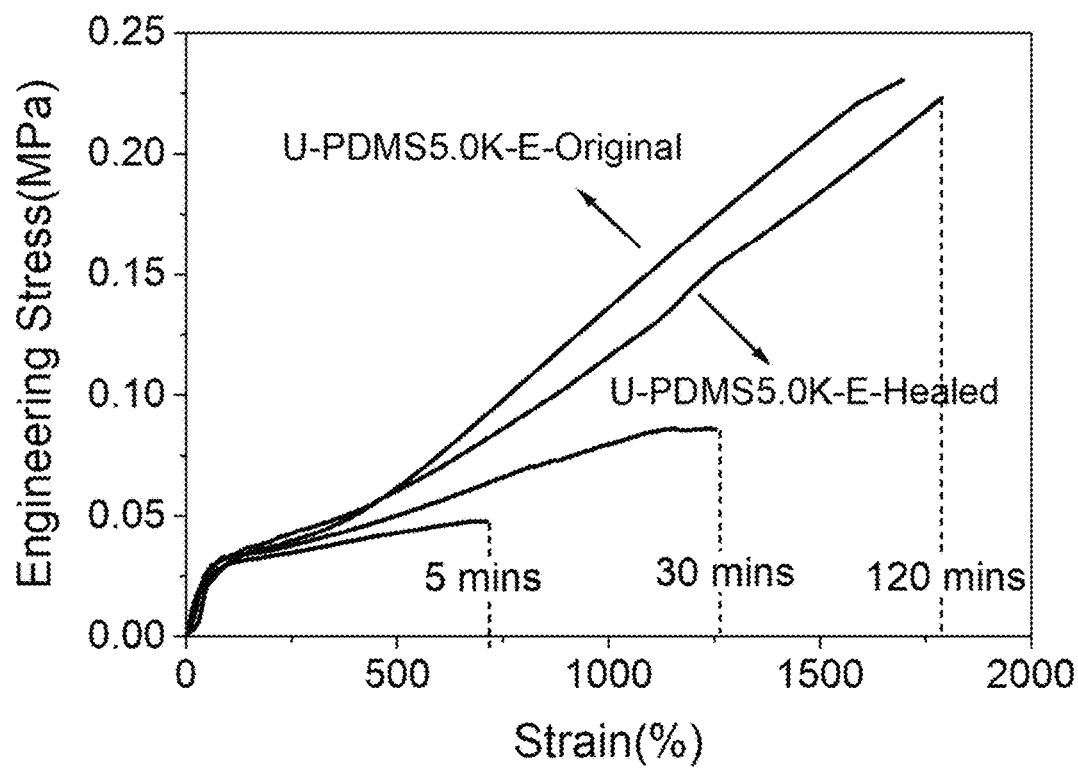
FIG. 6B is a plot of comparative tensile tests of original polymer membrane and after cut and healing process (5 mins, 30 mins and 120 mins healing at 25° C.).

Extrinsic and intrinsic are the two categories of healing strategies, and intrinsic self-healing usually relies on dynamic physical linkage or reversible covalent bonding. As a supramolecular polymer network containing hydrogen bonding sites, U-PDMS5.0K-E was evaluated for its self-healing properties, with the results shown in FIG. 6A. FIG. 6A is a schematic showing the healing process of polymer membranes made from U-PDMS5.0K-E. After cutting a specimen (thickness ~1.5 mm) into two pieces using a razor blade and bringing them into contact, the polymer membranes can be healed within 2 hours at ambient temperature (ca. 25° C.). Notably, the healing time can be shortened by increasing the healing temperature (e.g., 20 min at 40° C.). For a polymer film with lower thickness (~0.5 mm), around 2 mm of overlap is needed for a complete healing process. The low glass transition temperature of PDMS backbones (~−123° C.) is believed to contribute to the low-temperature healing process. FIG. 6B is a plot of comparative tensile tests of original polymer membrane and after cut and healing process (5 mins, 30 mins and 120 mins healing at 25° C.). As illustrated in FIG. 6B, after 30 mins at ambient temperature, the polymer film made from U-PDMS5.0K-E can retain 1,260% strain with a healing efficiency of 69.5%. After 2 hours, the mechanical performance of U-PDMS5.0K-E was restored, and nearly all of the mechanical parameters, i.e., Young's modulus, extensibility, ultimate tensile strength, and toughness are comparable with those before the specimen was cut. The completely recoverable mechanical performance, after the shorter healing period compared to other known systems, ensures the long lifetime of elastomeric products made from U-PDMS-Es. The simple self-healing process makes the U-PDMS-Es materials attractive for various applications, including functional surfaces, electric/ionic conductors, and different types of electronic devices.

Recoverable Gas-separation Functionality

Figure 7A:
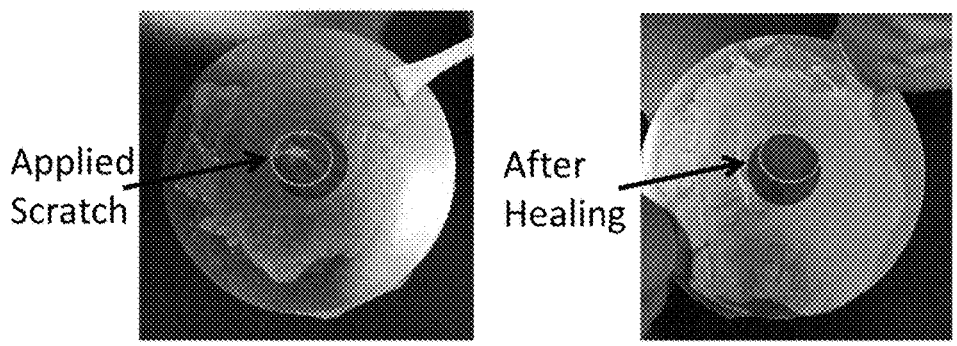
FIG. 7A presents two pictures showing gas-separation membranes made of U-PDMS-Es, with applied scratch and after healing at 40° C. for 30 mins.
Figure 7B:
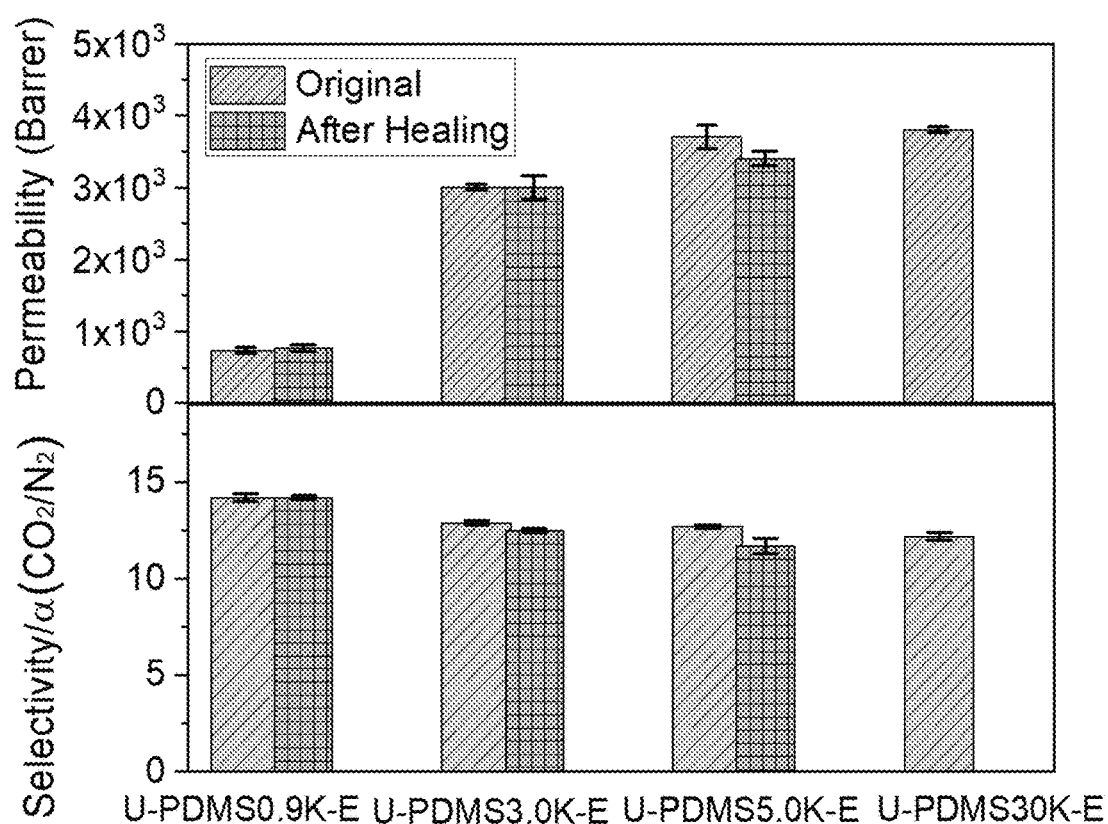
FIG. 7B shows comparative gas separation performance of original polymer membranes and polymer membranes after cut and healing, $CO_2$ permeability (top graph) and $CO_2/N_2$ selectivity (bottom graph).

Utilization of reversible chemical/physical bonding to heal mechanical fractures and recover functions, such as extensibility and separation capability, would be an effective solution to prolong the lifespan of polymer membranes. To demonstrate recoverable functionality of the polymer elastomer, the U-PDMS-Es were tested as gas-separation membranes where any type of defect will cause a complete loss of performance. FIG. 7A presents two pictures showing gas-separation membranes made of U-PDMS-Es, with applied scratch and after healing at 40° C. for 30 mins. As shown in FIG. 7A, after a 20 min (40° C.) healing process, the scratch was healed. The gas separation performance of U-PDMS-Es was evaluated using a custom-built constant volume-variable pressure test chamber with the results shown in FIG. 7B. FIG. 7B shows comparative gas separation performance of original polymer membranes and polymer membranes after cut and healing, $CO_2$ permeability (top graph) and $CO_2/N_2$ selectivity (bottom graph). As shown in FIG. 7B, most of the U-PDMS-Es exhibit very high gas permeability ($CO_2$ permeability >1,000 Barrer). A scratch (scratch width ≤150 μm for the membrane thickness ~200 μm) was applied to U-PDMS-E based membranes after initial gas-separation measurements, followed by healing (FIG. 7A). The healed samples were then transferred back to the chamber for a repeated test. As shown by the results in FIG. 7B, the membranes made from U-PDMS0.9K-E, U-PDMS3.0K-E and U-PDMS5.0K-E exhibited complete recovery of gas-separation performance, and the gas permeability and selectivity ($\alpha(CO_2/N_2)$) are both comparable with those of the original membranes. This healable property, exhibited at near ambient temperature, allows for minimal loss of gas separation performance even with membrane fracture and formation of pinholes. Only the membrane derived from U-PDMS30K-E could not be completely healed for gas-separation membranes, which may be due to its insufficient density of associating units. This indicates the critical role of supramolecular physical interactions in the self-healing process. Separation membranes would greatly benefit from recoverable functionality through self-healing chemistry because defects, fractures, and pin-holes often ruin their separation performance.

The incorporation of hydrogen bonding units also improves the gas selectivity of the obtained membranes. The four associating units (I)-(IV), shown in FIG. 1, also contribute as $CO_2$-philic groups in two ways: the oxygen atoms in the associating units can interact with electron deficient carbon in $CO_2$ molecules, and the hydrogens may also form weak hydrogen bonds with the oxygens in $CO_2$ molecules. The binding energy between the $CO_2$ and the associating units varies between −5.1 and −5.8 kcal/mol, and they are still of the same order of magnitude after the associating units forming the dimers. It is worth noting that the interaction energies between the associating units responsible for the self-healing mechanism are about three to four times higher than the $CO_2$ binding energy, which ensures the retention of the supramolecular structure and the mechanical robustness of the polymer membranes during the gas-separation process. The observed trade-off between membrane selectivity and permeability corresponds to the degree of hydrogen bonding and $CO_2$-philicity. In shorter PDMS polymer chains, the higher gas selectivity $\alpha(CO_2/N_2)$ is attributed to the higher density of $CO_2$-philic groups, whereas lower permeability corresponds to the higher cross-linking density attributed to both chemical bonding and physical interactions. The design criteria for achieving self-healing functionality demonstrated in this work should be applicable to various membrane applications, not only for gas separation, but also for fuel cells, flow batteries, and desalination, where healable properties and functionality is highly desired.

In summary, a series of polymer elastomers (U-PDMS-Es) with super stretchability, self-healing properties, and excellent damping properties was synthesized by urea functionalization of PDMS. With Tan δ≥0.3 as the criterion, the U-PDMS-Es showed excellent acoustic and vibration damping properties over a broad temperature range (>100° C.). Increasing the chain length of PDMS improved the extensibility of the PDMS-PEs (from 984 to 5,600%) whereas the shorter PDMS chain affords high Young's modulus and ultimate tensile strength and improved elasticity. Lowering the weight ratio of the elastic cross-linker was demonstrated as an alternative way to improve their extensibility. The U-PDMS-Es also exhibited strain dependent elastic recovery, and nearly perfect elastic recovery in a stretch state. The excellent self-healing capacity (2 hours at ambient temperature or 20 min at 40° C.) with completely restored mechanical performance was demonstrated in U-PDMS-Es with molecular weights of PDMS segments up to 5.0 kg/mol. The comparable gas-separation performance in terms of both permeability and selectivity of the U-PDMS-Es before and after the healing process also demonstrates their recoverable functionality.

Utilization of rubbery polymer segments as the spacer between hydrogen bonding units was demonstrated to be a useful strategy for the fabrication of polymeric elastomers with well-controlled properties. The super stretchability, adjustable Young's modulus, elasticity and ultimate tensile strength, along with completely recoverable mechanical performance and gas-separation capability make the demonstrated U-PDMS-Es attractive platform candidates for the fabrication of many functional films, membranes, coatings and devices with prolonged lifetimes.

While there have been shown and described what are at present considered the preferred embodiments of the invention, those skilled in the art may make various changes and modifications which remain within the scope of the invention defined by the appended claims.

What is claimed is:

1. An elastic composition comprising the following structure:

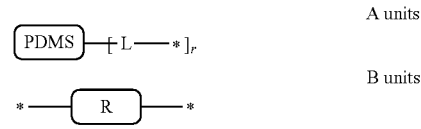

wherein:
PDMS is polydimethylsiloxane having at least 5 and no more than 100 dimethylsiloxane units;
L is a bond or hydrocarbon linker;
the asterisk (*) in A units denotes a connection point with an asterisk in B units, and at least one of the following linkages connect between connection points:

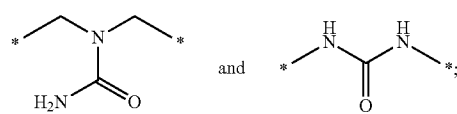

r is an integer of at least 4;
R is a hydrocarbon or siloxane-containing linking moiety;
the composition includes a multiplicity of A units and multiplicity of B units; and
a portion of the connection points are necessarily terminated by endcapping groups, wherein at least a portion of the endcapping groups are selected from the following structures:

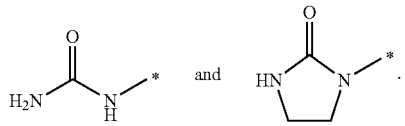

2. The elastic composition of claim 1, wherein PDMS is polydimethylsiloxane having at least 10 and no more than 100 dimethylsiloxane units.

3. The elastic composition of claim 1, wherein PDMS is polydimethylsiloxane having at least 20 and no more than 100 dimethylsiloxane units.

4. The elastic composition of claim 1, wherein the number of B units is greater than the number of A units.

5. The elastic composition of claim 1, wherein the number of B units is at least double the number of A units.

6. The elastic composition of claim 1, wherein R is a hydrocarbon linking moiety.

7. The elastic composition of claim 6, wherein R has the structure $—(CH_2)_m—$, wherein m is an integer of 2-20; one or more H atoms in R are optionally replaced with methyl or ethyl groups; one or more $—O—$ or $—NH—$ linkers optionally inserted between carbon atoms in R; one or more H atoms in R are optionally replaced with OH or $NH_2$ groups; and two H atoms on a carbon atom are optionally replaced with an O atom to result in a carbonyl group.

8. The elastic composition of claim 6, wherein R comprises a ring.

9. The elastic composition of claim 1, wherein R is a polysiloxane.

10. The elastic composition of claim 9, wherein said polysiloxane has a molecular weight of 350-7400 g/mol.

11. The elastic composition of claim 9, wherein R is a polydimethylsiloxane.

12. The elastic composition of claim 1, wherein the elastic composition exhibits an ultimate elongation of at least or more than 100%.

13. The elastic composition of claim 1, wherein the elastic composition exhibits an ultimate elongation of at least or more than 300%.

14. The elastic composition of claim 1, wherein the elastic composition exhibits an ultimate elongation of at least or more than 600%.

15. The elastic composition of claim 1, wherein the elastic composition exhibits an ultimate tensile strength of at least 50 kPa.

16. The elastic composition of claim 1, wherein the elastic composition is a film having a thickness of 20-1000 microns.

17. The elastic composition of claim 1, wherein PDMS is polydimethylsiloxane having at least 10 and no more than 50 dimethylsiloxane units.

18. The elastic composition of claim 1, wherein PDMS is polydimethylsiloxane having at least 10 and no more than 20 dimethylsiloxane units.

19. A method for producing an elastic composition, the method comprising reacting the following components:

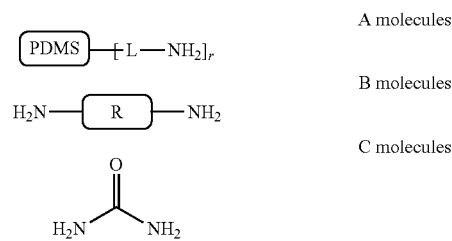

under conditions where C molecules and amino groups from molecules A and B undergo condensation to produce a product having the following structure:

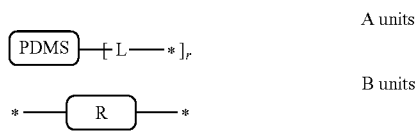

wherein:
PDMS is polydimethylsiloxane having at least 5 and no more than 100 dimethylsiloxane units;
L is a bond or hydrocarbon linker;
the asterisk (*) in A units denotes a connection point with an asterisk in B units, and at least one of the following linkages connect between connection points:

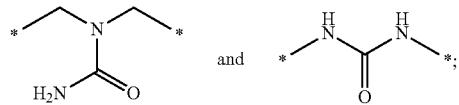

r is an integer of at least 4;
R is a hydrocarbon or siloxane-containing linking moiety;
the composition includes a multiplicity of A units and multiplicity of B units; and
a portion of the connection points are necessarily terminated by endcapping groups, wherein at least a portion of the endcapping groups are selected from the following structures:

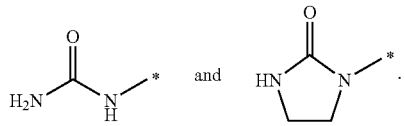

20. The method of claim 19, wherein PDMS is polydimethylsiloxane having at least 10 and no more than 100 dimethylsiloxane units.

21. The method of claim 19, wherein PDMS is polydimethylsiloxane having at least 20 and no more than 100 dimethylsiloxane units.

22. The method of claim 19, wherein the number of B molecules is greater than the number of A molecules, and the number of B units is greater than the number of A units.

23. The method of claim 19, wherein the number of B molecules is at least double the number of A molecules, and the number of B units is at least double the number of A units.

24. The method of claim 19, wherein R is a hydrocarbon linking moiety.

25. The method of claim 19, wherein R is a polysiloxane.

26. The method of claim 19, wherein A molecules have the following structure:

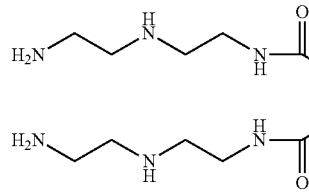

wherein n is at least 4.

27. The method of claim 19, wherein B molecules have the following structure:

wherein n is 0 or at least 1.

28. An elastic composition comprising the following structure:

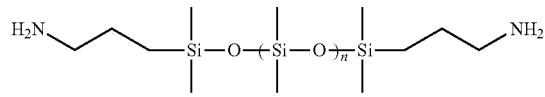 A units

 B units wherein:
PDMS is polydimethylsiloxane having at least 5 and no more than 100 dimethylsiloxane units;
L is a bond or hydrocarbon linker;
the asterisk (*) in A units denotes a connection point with an asterisk in B units, and at least one of the following linkages connect between connection points:

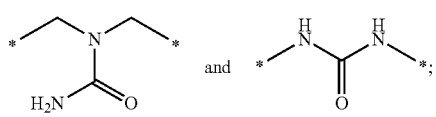

r is an integer of at least 3;
R is a hydrocarbon linking moiety;
the composition includes a multiplicity of A units and multiplicity of B units; and a portion of the connection points are necessarily terminated by endcapping groups, wherein at least a portion of the endcapping groups are selected from the following structures:

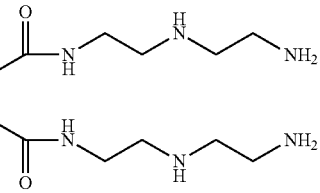

29. A method for producing an elastic composition, the method comprising reacting the following components:

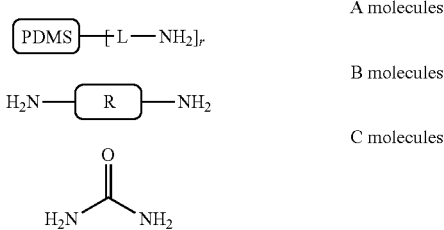

under conditions where C molecules and amino groups from molecules A and B undergo condensation to produce a product having the following structure:

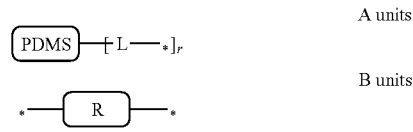 A units

B units wherein:
PDMS is polydimethylsiloxane having at least 5 and no more than 100 dimethylsiloxane units;
L is a bond or hydrocarbon linker;
the asterisk (*) in A units denotes a connection point with an asterisk in B units, and at least one of the following linkages connect between connection points:

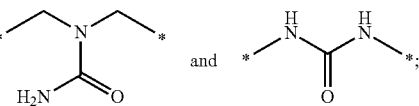

r is an integer of at least 3;
R is a hydrocarbon linking moiety;
the composition includes a multiplicity of A units and multiplicity of B units; and a portion of the connection points are necessarily terminated by endcapping groups, wherein at least a portion of the endcapping groups are selected from the following structures:
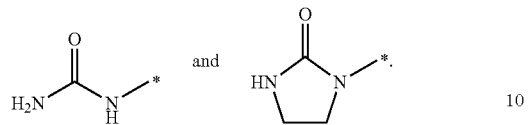
* * * * *